US012715013B2

(12) United States Patent
Ingebrand et al.

(10) Patent No.: US 12,715,013 B2
(45) Date of Patent: Aug. 25, 2026

(54) SOLVENT DOSING FOR A SPRAY APPLICATOR

(71) Applicant: Graco Minnesota Inc., Minneapolis, MN (US)

(72) Inventors: John R. Ingebrand, New Prague, MN (US); Christopher J. Pellin, Victoria, MN (US); Justin J. Weldon, Belle Plaine, MN (US); Joseph E. Tix, Hastings, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 387 days.

(21) Appl. No.: 18/564,923

(22) PCT Filed: Jun. 3, 2022

(86) PCT No.: PCT/US2022/032127
§ 371 (c)(1),
(2) Date: Nov. 28, 2023

(87) PCT Pub. No.: WO2022/256630
PCT Pub. Date: Dec. 8, 2022

(65) Prior Publication Data

US 2025/0114813 A1 Apr. 10, 2025

Related U.S. Application Data

(60) Provisional application No. 63/196,965, filed on Jun. 4, 2021.

(51) Int. Cl.
*B05B 15/55* (2018.01)
*B05B 1/30* (2006.01)
(Continued)

(52) U.S. Cl.
CPC .......... *B05B 15/557* (2018.02); *B05B 1/3026* (2013.01); *B05B 7/0408* (2013.01);
(Continued)

(58) Field of Classification Search
CPC ..... B05B 15/55; B05B 15/555; B05B 15/557; B05B 7/0408; B05B 7/2497; B05B 1/3026
See application file for complete search history.

(56) References Cited

U.S. PATENT DOCUMENTS 3,146,950 A * 9/1964 Lancaster ............... B05B 15/55 239/128
3,799,403 A * 3/1974 Probst .................. B05B 7/1272 239/414

(Continued)

FOREIGN PATENT DOCUMENTS

DE 102012001896 A1 8/2013
GB 1381556 A 1/1975

OTHER PUBLICATIONS

International Search Report and Written Opinion for PCT Application No. PCT/US2022/032127, Dated Sep. 22, 2022, p. 16.

(Continued)

*Primary Examiner* — Cody J Lieuwen
(74) *Attorney, Agent, or Firm* — Kinney & Lange, P.A.

(57) ABSTRACT

A spray applicator is operable in a spray state, during which the applicator emits a plural component material formed within a mix chamber of the spray application, and a purge state, during which the spray applicator emits compressed air from the mix chamber. First and second portions of the purge air are provided to the mix chamber through separate flowpaths and combine within the mix chamber. Only one of the portions of purge air is routed through a dosing chamber to entrain solvent and carry the solvent to the mix chamber. The solvent assists in clearing residue from the mix chamber.

21 Claims, 9 Drawing Sheets

(51) Int. Cl.

| | |
|---|---|
| ***B05B 7/04*** | (2006.01) |
| ***B05B 7/12*** | (2006.01) |
| ***B05B 7/24*** | (2006.01) |
| *B05B 15/63* | (2018.01) |

(52) U.S. Cl.
CPC .......... *B05B 7/1209* (2013.01); *B05B 7/2497* (2013.01); *B05B 15/63* (2018.02)

(56) References Cited

U.S. PATENT DOCUMENTS

| | | | | | |
|---|---|---|---|---|---|
| 3,945,569 | A * | 3/1976 | Sperry | B29B 7/7678 | 239/117 |
| 5,950,875 | A * | 9/1999 | Lee | B29B 7/808 | 222/145.5 |
| 8,182,614 | B2 * | 5/2012 | Tix | C11D 7/263 | 510/202 |
| 8,297,531 | B2 | 10/2012 | Anderson et al. | | |
| 8,939,328 | B2 | 1/2015 | Velgersdyk et al. | | |
| 9,381,533 | B2 | 7/2016 | Pellin et al. | | |
| 2015/0041556 | A1 * | 2/2015 | Conarro | B29B 7/7452 | 239/104 |

OTHER PUBLICATIONS

International Preliminary Report on Patentability for PCT Application No. PCT/US2022/032127, Dated Nov. 21, 2023, p. 11.

* cited by examiner

SOLVENT DOSING FOR A SPRAY APPLICATOR

CROSS-REFERENCE TO RELATED APPLICATION(S)

This application is a 371 national phase application of International Application No. PCT/US2022/032127, filed Jun. 3, 2022, which claims the benefit of U.S. Provisional Application No. 63/196,965 filed Jun. 4, 2021 for "SOLVENT DOSING FOR A SPRAY APPLICATOR," the disclosure of which is hereby incorporated by reference in its entirety.

BACKGROUND

This disclosure relates generally to fluid sprayers. More specifically, this disclosure relates to plural component spray applicators.

Plural component sprayers are configured to generate and apply coatings to substrates, such as spray foam insulation and elastomer coatings. Spray foam insulation is applied to substrates to provide thermal insulation from the environment. Elastomer coatings can be applied to a substrate to protect a surface, an example of which is a spray-in truck bed liner. For plural component spraying, two or more base components are mixed within the spray applicator causing a chemical reaction that forms the plural component material from the base component materials. Plural component sprayers can emit purge air through the mixing area and spray orifice to clear the fast-setting plural component material from within the sprayer to prevent clogging.

SUMMARY

According to one aspect of the disclosure, a spray apparatus includes a sprayer body; a mix chamber supported by the sprayer body; a spray valve supported by the sprayer body, wherein the spray valve is actuatable between a first position associated with a spray mode and a second position associated with a purge mode; and a purge air pathway extending through the sprayer body. The purge air pathway includes a first passage extending to a first inlet port of the mix chamber, the first passage configured to provide a first portion of purge air to the mix chamber through the first inlet port; and a second passage fluidly isolated from the first passage and extending to a second inlet port of the mix chamber, the second passage configured to provide a second portion of purge air to the mix chamber through the second inlet port. Only one of the first passage and the second passage is configured to receive solvent from the solvent reservoir.

According to an additional or alternative aspect of the disclosure, a sprayer apparatus includes a sprayer body; a mix chamber supported by the sprayer body, the mix chamber including a first inlet bore, a second inlet bore, and a mixing bore; a first material pathway extending through the sprayer body to the first inlet bore; a second material pathway extending through the sprayer body to the second inlet bore; a purge air pathway extending through the sprayer body; a solvent pathway formed in the sprayer body, the solvent pathway extending from a solvent reservoir to a holding chamber; and a dosing rod supported by the sprayer body, wherein the dosing rod is configured to provide a dose volume of the solvent to a dosing chamber from the holding chamber. The purge air pathway includes a common passage configured to receive a supply of compressed air; a first passage extending from the common passage to the first inlet bore of the mix chamber, the first passage configured to provide a first portion of the compressed air to the mix chamber through the first inlet bore; and a second passage extending from the common passage to the second inlet bore of the mix chamber, the second passage configured to provide a second portion of the compressed air to the mix chamber through the second inlet bore. The second passage extends through the dosing chamber at a location downstream of an intersection between the common passage, the first passage, and the second passage.

According to another additional or alternative aspect of the disclosure, a method of spraying includes placing a spray applicator in a spray mode, wherein a spray valve of the spray applicator fluidly connects a first material pathway with a mix chamber and fluidly connects a second material pathway with the mix chamber with the spray applicator in the spray mode; emitting, by the spray applicator, a plural component material formed within the mix chamber by a first base component material provided to the mix chamber by the first material pathway and a second base component material provided to the mix chamber by the second material pathway; shifting the spray valve from a first position associated with the spray mode to a second position associated with a purge mode; flowing, with the spray applicator in the purge mode, a first portion of purge air to the mix chamber through a first purge air pathway and a second portion of purge air to the mix chamber through a second purge air pathway; and entraining a dose volume of solvent within the second portion of purge air at a location upstream of the mix chamber and downstream of an intersection where the first purge air pathway splits from the second purge air pathway, such that the dose volume of solvent is provided to the mix chamber through only the second purge air pathway.

DETAILED DESCRIPTION

This disclosure is directed to a spray applicator for applying plural component materials to a substrate. The spray applicator includes a mix chamber configured to receive separate flows of different first and second base component materials to form the plural component material. The spray applicator emits the combined plural component material during a spray mode and emits purge air during a purge mode. First and second purge air flows are provided to the mix chamber to purge material residue from the mix chamber. Solvent is injected into only one of the first and second purge air flows to be carried to mix chamber by that portion of the purge air. The solvent assists in clearing residue from the mix chamber.

Figure 1A:
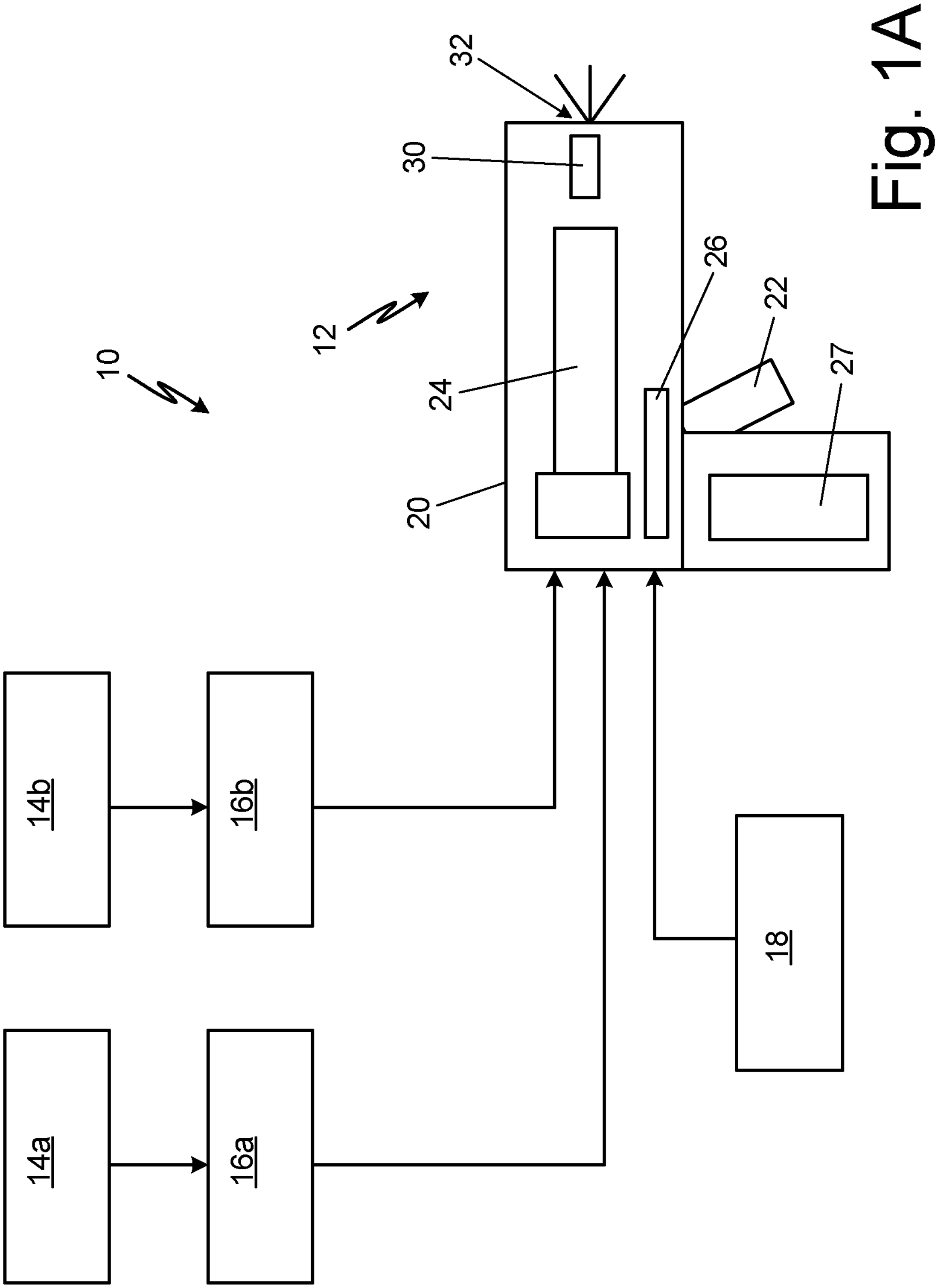
FIG. 1A is a schematic block diagram of a spray system.
Figure 1B:
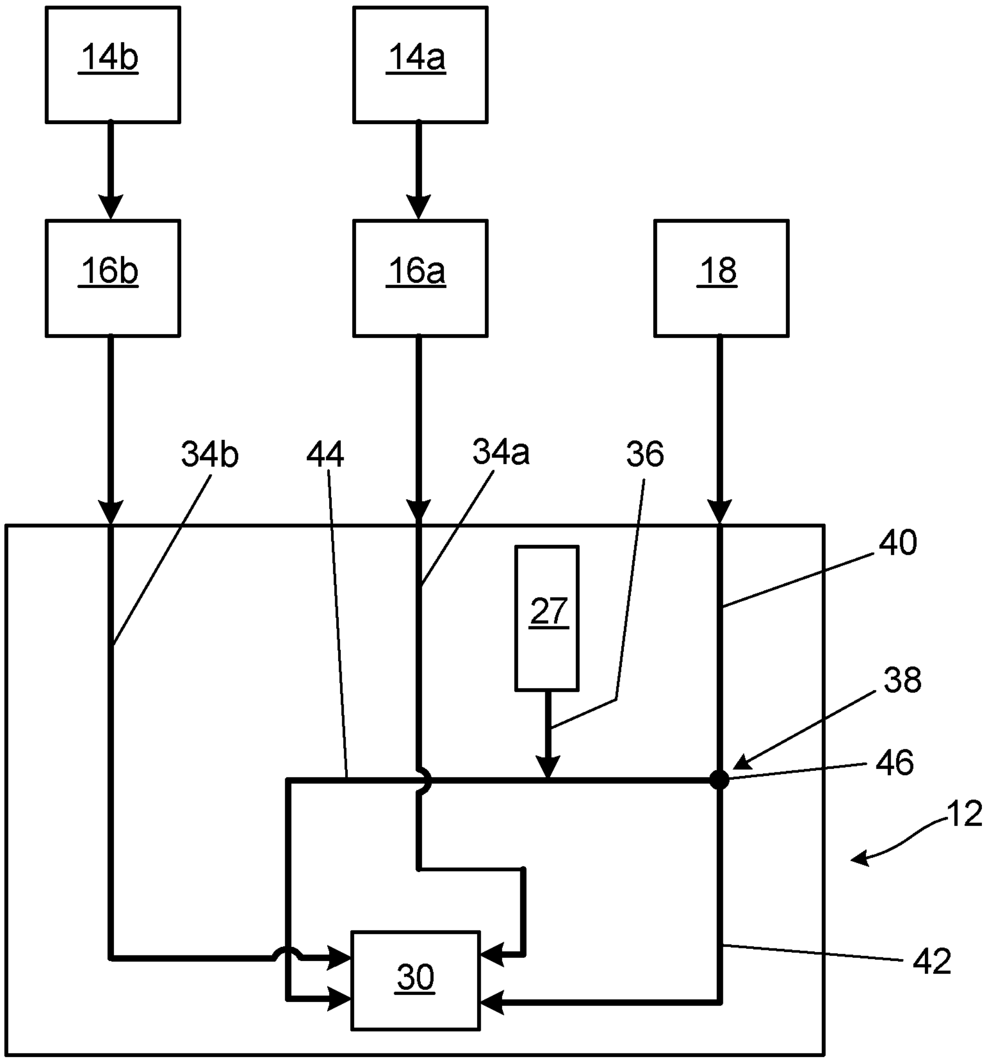
FIG. 1B is a schematic block diagram of the spray system of FIG. 1A showing flowpaths through a spray applicator.

FIG. 1A is a schematic block diagram of spray system 10. FIG. 1B is a schematic block diagram of spray system 10 showing flowpaths through spray applicator 12. FIGS. 1A and 1B will be discussed together. Spray system 10 includes spray applicator 12, material supplies 14*a* and 14*b*, pumps 16*a* and 16*b*, and air supply 18. Spray applicator 12 includes body 20, trigger 22, spray valve 24, control valve 26, solvent reservoir 27, mix chamber 30, and spray orifice 32. As shown in FIG. 1B, spray applicator 12 further includes material pathway 34*a*, material pathway 34*b*, solvent pathway 36, and air pathway 38. Air pathway 38 includes common passage 40, first passage 42, and second passage 44.

Spray system 10 is a system configured to generate a material spray and apply the material spray to a substrate. In some examples, spray system 10 is configured to combine two or more base component materials to generate a plural component material for application to the substrate. In some examples, spray system 10 is configured to generate and apply spray foam insulation or elastomer coating onto the substrate, among other spray options.

Material supplies 14*a*, 14*b* store supplies of base component materials prior to spraying. A plural component material, such as the spray foam or elastomer coating, is formed by mixing the base component materials within mix chamber 30. Spray foam insulation is discussed herein as an exemplar, but it is understood that the disclosure is not limited to spray foam applications. For example, fluid supply 14*a* can store a first base component material, such as a resin, and fluid supply 14*b* can store a second base component material, such as a catalyst. In some examples, the first one of the base component materials can be polyol resin and the second one of the base component materials can be isocyanate. The first and second base component materials combine at spray applicator 12 (e.g., within mix chamber 30) and are ejected from spray applicator 12 as a spray of the plural component material. Spray applicator 12 generates the spray of the plural component material and applies the plural component material to the substrate. Spray applicator 12 can alternatively be referred to as a mixer, mixing manifold, dispenser, and/or spray gun, among other options.

Pump 16*a* is configured to draw the first base component material from fluid supply 14*a* and transfer the first base component material downstream to spray applicator 12. Pump 16*b* is configured to draw the second base component material from fluid supply 14*b* and transfer the second base component material downstream to spray applicator 12. Pumps 16*a*, 16*b* can be controlled by a system controller (not shown). The first base component material flows through material pathway 34*a* in spray applicator 12. The second base component material flows through material pathway 34*b* in spray applicator 12. The first base component material is fluidly isolated from the second base component materials at locations upstream of mix chamber 30.

Air supply 18 is connected to spray applicator 12 and configured to provide a flow of compressed air to spray applicator 12. Air supply 18 can be of any suitable configuration for providing the compressed air to spray applicator 12. For example, air supply 18 can be a compressor, a pressurized tank, or of any other configuration suitable for providing a pressurized pneumatic flow. Air supply 18 provides the pressurized air to air pathway 38 through spray applicator 12. The pressurized air is initially provided to common passage 40. Common passage 40 splits into first passage 42 and second passage 44 at intersection 46. First passage 42 and second passage 44 are configured to provide individual flows of pressurized purge air to mix chamber 30. First passage 42 is configured to provide a first portion of the pressurized purge air to mix chamber 30 through the same port in mix chamber 30 that material pathway 34*a* provides the first base component material. Second passage 44 is configured to provide second portion of the pressurized purge air to mix chamber 30 through the same port in mix chamber 30 that material pathway 34*b* provides the second base component material.

Spray applicator 12 is configured to generate and apply the spray of the plural component material. Body 20 of spray applicator 12 supports other components of spray applicator 12. Spray valve 24 is disposed at least partially within spray applicator 12. Spray valve 24 controls whether the first and second base component materials flow to mix chamber 30 or whether the first and second purge air flows flow to mix chamber 30. Control valve 26 is disposed at least partially within spray applicator 12. Control valve 26 is operatively connected to spray valve 24 to actuate spray valve 24 between spray and purge states, as discussed in more detail below. Mix chamber 30 is disposed at the downstream ends of material pathways 34*a*, 34*b*, first passage 42, and second passage 44. Spray orifice 32 is formed in mix chamber 30. With spray applicator 12 in a spray mode, mix chamber 30 receives the first and second base component materials, the plural component material is formed within mix chamber 30, and a spray of the plural component material is emitted through spray orifice 32. With spray applicator 12 in a purge mode, mix chamber 30 receives the first and second purge air flows and emits purge air through spray orifice 32. The purge air is configured to clear residue from within mix chamber 30 to prevent the plural component material from curing within mix chamber 30 and prevent clogging of spray orifice 32.

Trigger 22 is attached to spray applicator 12 and configured to control the spraying by spray applicator 12. Trigger 22 is configured to be actuated to transition spray applicator 12 between the spray mode, during which the plural component material is formed and emitted, and the purge mode, during which the purge air is emitted. The user can actuate trigger 22 to cause spray valve 24 to shift to the spray state, thereby fluidly connecting material pathways 34*a*, 34*b* with mix chamber 30 and fluidly disconnecting first passage 42 and second passage 44 from mix chamber 30. The base component materials combine within mix chamber 30 to form the plural component material that is emitted from spray orifice 32. The user releases trigger 22 to cause spray valve 24 to shift to the purge state, thereby fluidly disconnecting material pathways 34*a*, 34*b* from mix chamber 30 and fluidly connecting first passage 42 and second passage 44 with mix chamber 30. The purge air portions flow through first passage 42 and second passage 44 into mix chamber 30 and are emitted from spray orifice 32. It is understood that trigger 22 can be of any configuration suitable for activating and deactivating the spraying of spray applicator 12. While spray applicator 12 is described as a manual spray gun configured to be held and manipulated by a user, it is understood that other examples of spray applicator 12 can be automatic such that spray applicator 12 does not include a manually actuated trigger 22 or handle.

Solvent reservoir 27 is fluidly connected to mix chamber 30 to provide solvent to mix chamber 30. The solvent assists in clearing mix chamber 30 with spray applicator 12 in the purge mode. For example, the solvent can slow the reaction process to inhibit curing and can dissolve uncured plural component material. Solvent reservoir 27 can disposed within spray applicator 12, such as within a handle of spray applicator 12. Solvent reservoir 27 contains the solvent. In some examples, solvent reservoir 27 can be formed as a cartridge that can be removed and replaced as a single unit. Solvent pathway 36 extends downstream from solvent reservoir 27 to air pathway 38. More specifically, solvent pathway 36 extends to second passage 44 of air pathway 38 at a location downstream of intersection 46 between first passage 42 and second passage 44. The positive pressure within air pathway 38 prevents the solvent from backflowing to first passage 42.

Spray applicator 12 is configured such that solvent is provided to mix chamber 30 via second passage 44 but not via first passage 42. Providing the solvent through only second passage 44 prevents mixing of the solvent with the base component material provided through material pathway 34*a* at locations upstream of mix chamber 30. For example, material pathway 34*b* can be configured to provide the resin base component material to mix chamber 30 while material pathway 34*a* can be configured to provide the isocyanate base component material. Isocyanate is moisture-sensitive and can cure when exposed to a liquid, such as the solvent. The cured isocyanate forms crystals that can cause scoring or other damage to soft seals and clogging of pathways through spray applicator 12. Flowing the solvent into mix chamber 30 through the same port as the resin prevents mixing of solvent and isocyanate within spray applicator 12 at locations upstream of mix chamber 30.

During operation, the user actuates trigger 22 to transition spray applicator 12 between the spray and purge modes. Trigger 22 is operably associated with control valve 26 to control a position of spray valve 24 via control valve 26. In some examples, control valve 26 directs compressed air from air supply 18 to spray valve 24 to drive spray valve 24 between positions associated with the spray mode and the purge mode. For example, control valve 26 can direct the compressed air through a first internal pathway within spray applicator 12 to drive spray valve 24 from a first position associated with the spray mode to a second position associated with the purge mode. Control valve 26 can then shift positions to direct the compressed air through a second internal pathway within spray applicator 12 to drive spray valve 24 from the second position to the first position.

Spray applicator 12 is initially in the purge mode such that the first passage 42 and second passage 44 are fluidly connected to mix chamber 30 and spray applicator 12 emits purge air through spray orifice 32. The user actuates trigger 22 to cause spray valve 24 to transition to the first position associated with the spray mode. With spray valve 24 in the first position, material pathways 34*a*, 34*b* are fluidly connected to mix chamber 30 while first passage 42 and second passage 44 are fluidly disconnected from mix chamber 30. The first and second base component materials flow into mix chamber 30 and mix within mix chamber 30 to form the plural component material. The plural component material is emitted from spray orifice 32. Spray valve 24 is maintained in the spray state until the user releases trigger 22. Upon release of trigger 22, control valve 26 shifts to direct pressurized air to spray valve 24 to cause spray valve 24 to shift to the second position associated with the purge mode. With spray valve 24 in the second position, material pathways 34 are fluidly disconnected from mix chamber 30 and air pathway 38 is fluidly connected to mix chamber 30. More specifically, each of first passage 42 and second passage 44 are fluidly connected to mix chamber 30. Pressurized air flows into mix chamber 30 from both first passage 42 and second passage 44 and is emitted through spray orifice 32. The second purge air portion provided to mix chamber 30 through second passage 44 carries solvent from solvent reservoir 27 to and through mix chamber 30. The solvent can dissolve any plural component material within mix chamber 30 to prevent hardening and clogging. The solvent is provided through only second passage 44 to prevent contact between the solvent and first the base component material provided through material pathway 34*a* at locations upstream of mix chamber 30.

Figure 2A:
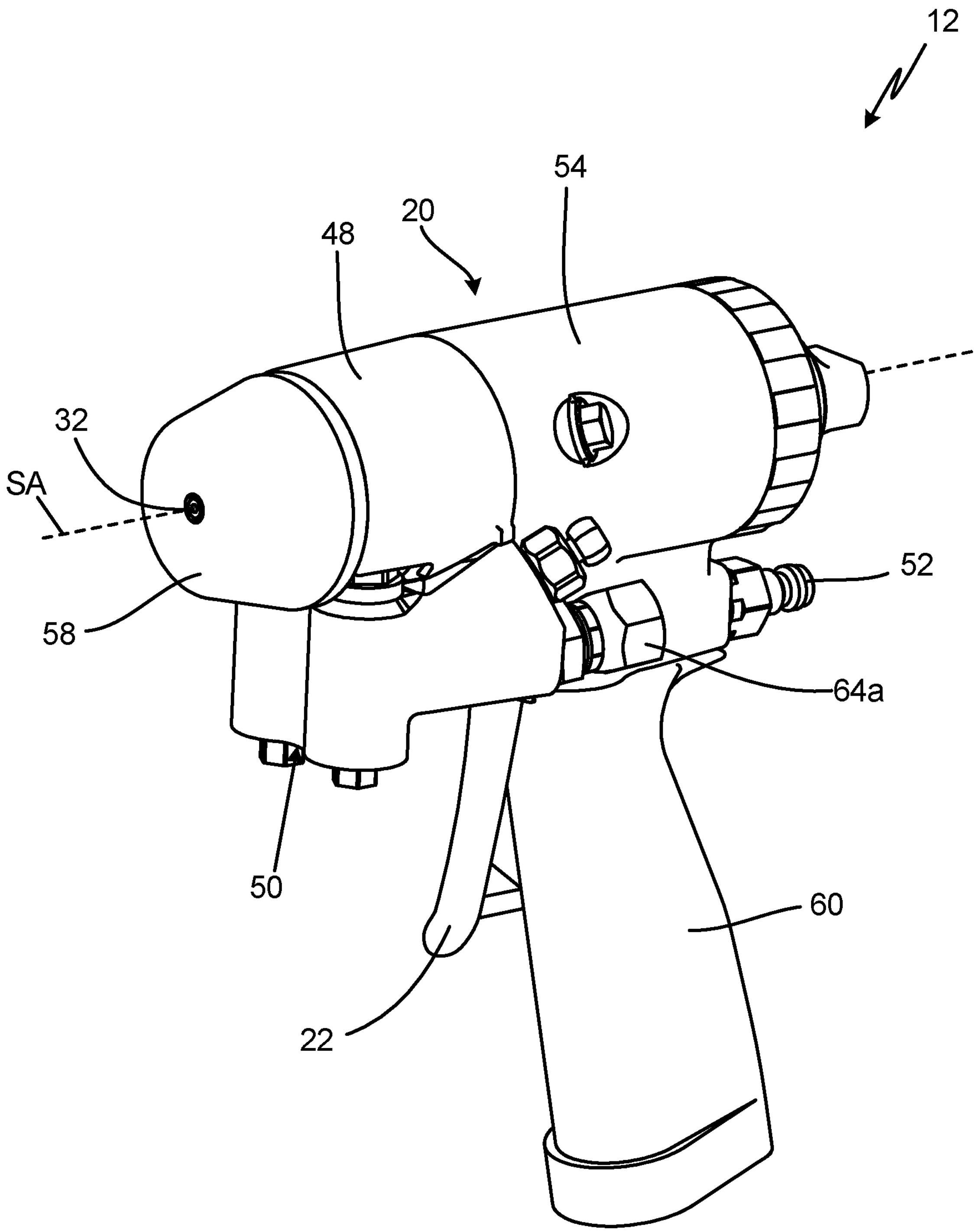
FIG. 2A is an isometric view of a spray applicator.
Figure 2B:
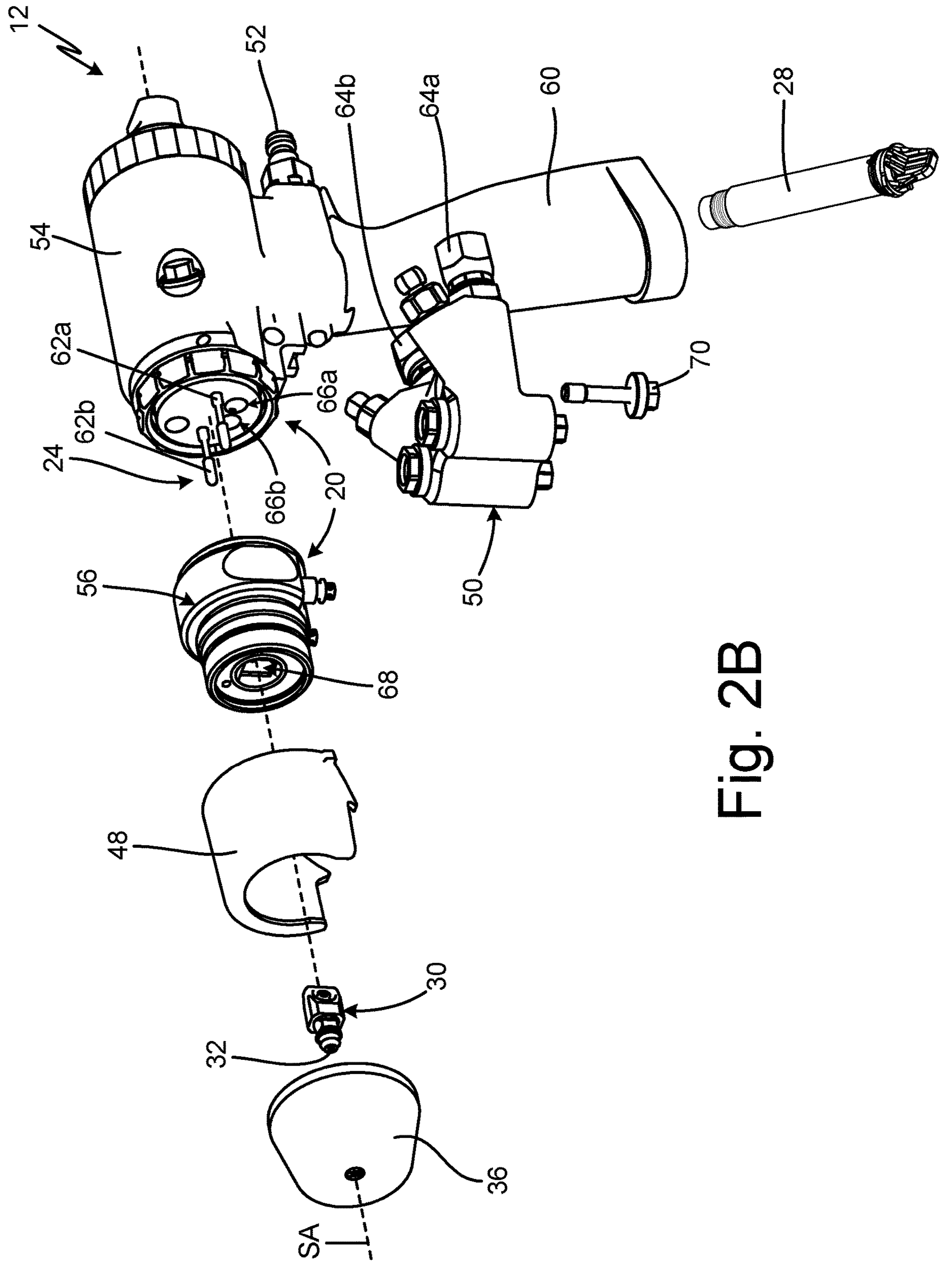
FIG. 2B is an isometric exploded view of the spray applicator.

FIG. 2A is an isometric view of spray applicator 12. FIG. 2B is an exploded isometric view of spray applicator 12. FIGS. 2A and 2B will be discussed together. Spray applicator 12 includes body 20, trigger 22, spray valve 24, solvent cartridge 28, mix chamber 30, spray orifice 32, cover 48, material manifold 50, and air receiver 52. Body 20 includes support housing 54, fluid cartridge 56, retainer cap 58, and handle 60. Shuttles 62*a*, 62*b* of spray valve 24 are shown. Material manifold 50 includes base component inlet 64*a* and base component inlet 64*b*.

Body 20 supports other components of spray applicator 12. Body 20 can be formed as a unitary component or as multiple components fixed together. In the example shown, support housing 54 supports and at least partially encloses components of spray valve 24 and control valve 26. Fluid cartridge 56 is removably mountable to support housing 54. Handle 60 extends from support housing 54. The user can grasp handle 60 to manipulate and orient spray applicator 12. Handle 60 can, in some examples, house other components of spray applicator 12, such as solvent cartridge 28. An exhaust port can be formed through handle 60 to exhaust air from spray valve 24. Trigger 22 is supported by and can be connected to body 20. More specifically, trigger 22 is connected to support housing 54 in the example shown. Trigger 22 is configured to control spraying by spray applicator 12. Outlet apertures 66*a*, 66*b* are formed through support housing 54. Outlet aperture 66*a* forms a portion of the first passage 42 of air pathway 38 and outlet aperture 66*b* forms a portion of the second passage 44 of air pathway 38. Outlet apertures 66*a*, 66*b* are openings through which the first and second portions of the purge air exit support housing 54.

Spray valve 24 is supported by spray applicator 12. In the example shown, spray valve 24 is at least partially disposed within support housing 54. Spray valve 24 includes shuttles 62*a*, 62*b* that project out of support housing 54 and into fluid cartridge 56. In the example shown, shuttles 62*a*, 62*b* form the flow control components of spray applicator 12. Shuttles 62*a*, 62*b* are configured to shift axially relative to spray axis SA to transition spray applicator 12 between the spray mode and the purge mode.

Fluid cartridge 56 is mountable to support housing 54. Fluid cartridge 56 can be connected to support housing 54 in any desired manner. For example, fluid cartridge 56 can be connected to support housing 54 by interfaced threading, among other options. Portions of both material pathways 34*a*, 34*b* and air pathway 38 are formed through fluid cartridge 56. Cavity 68 is formed in an end of fluid cartridge 56 opposite the end interfacing with support housing 54. Cavity 68 houses mix chamber 30 during operation. Spray orifice 32 is formed in an end of mix chamber 30 oriented out of cavity 68. In the example shown, mix chamber 30 is a stationary mix chamber in that mix chamber 30 does not shift relative to spray axis SA during spray operations. It is understood, however, that not all examples are so limited. As discussed in more detail below, fluid cartridge 56 receives the first purge air portion from support housing 54 through outlet aperture 66*a* and the second purge air portion through outlet aperture 66*b*. The first and second purge air portions are fluidly isolated from each other within fluid cartridge 56 until combining in mix chamber 30.

Cover 48 extends at least partially around fluid cartridge 56. In the example shown, cover 48 covers the interface between fluid cartridge 56 and support housing 54. Cover 48 can be connected to support housing 54 and/or fluid cartridge 56. Retainer cap 58 is attached to fluid cartridge 56. The end of fluid cartridge 56 in which cavity 68 is formed can extend axially beyond cover 48. Retainer cap 58 can be connected to that portion of fluid cartridge 56 projecting beyond cover 48. Retainer cap 58 can be connected to fluid cartridge 56 by interfaced threading, among other options. Retainer cap 58 is configured to secure internal components within spray applicator 12, such as by securing mix chamber 30 within cavity 68. It is understood, however, that mix chamber 30 can be secured to body 20 in any suitable manner.

Material manifold 50 is mountable to spray applicator 12. In the example shown, material manifold 50 interfaces with fluid cartridge 56 to provide the first and second base component materials to fluid cartridge 56. The first and second base component materials flow within fluid cartridge 56, but not within support housing 54 in the example shown. Material manifold 50 is mounted to support housing 54 by fastener 70, though it is understood that other connection types are possible. Base component inlet 64*a* is a fitting configured to connect to a hose or other fluid line to receive the first base component material from a first material supply (e.g., fluid supply 14*a* (FIGS. 1A and 1B)). Base component inlet 64*b* is a fitting configured to connect to a hose or other fluid line to receive the second base component material from a second material supply (e.g., fluid supply 14*b* (FIGS. 1A and 1B)).

Air receiver 52 is mounted to spray applicator 12 and provides a location for compressed air to enter into spray applicator 12. In the examples shown, air receiver 52 is mounted to a back end of support housing 54 while fluid cartridge 56 is mounted to a front end of support housing 54. Air receiver 52 is a fitting configured to connect to a hose, pipe, tube, or other air line to receive pressurized air form an air source (e.g., air supply 18 (FIGS. 1A and 1B).

Solvent cartridge 28 is mountable to spray applicator 12. Solvent cartridge 28 forms the solvent reservoir 27 of spray applicator 12. In the example shown, solvent cartridge 28 is configured to mount within handle 60. As discussed in more detail below, solvent cartridge 28 provides solvent to the second passage 44 at a location within body 20. More specifically, the solvent is provided to second passage 44 at a location within support housing 54 and upstream of fluid cartridge 56. The second purge air portion entrains the dose of solvent and carries the solvent downstream out of support housing 54, through fluid cartridge 56, and to mix chamber 30. The first and second purge air portions are fluidly isolated within fluid cartridge 56.

During operation, the first base component material is provided to spray applicator 12 at base component inlet 64*a*, the second base component material is provided to spray applicator 12 at base component inlet 64*b*, and compressed air is provided to spray applicator 12 at air receiver 52. Spray valve 24 controls flows of the base component materials and compressed purge air to mix chamber 30. Trigger 22 controls actuation of spray valve 24 to place spray applicator 12 in the spray and purge states. With spray valve 24 in the first position associated with the spray mode, the first and second base component materials flow to and mix within mix chamber 30 and the resulting plural component material is emitted through spray orifice 32. Shuttles 62*a*, 62*b* prevent the first and second purge air portions from flowing into mix chamber 30 with spray applicator 12 in the spray state. With spray valve 24 in the second position associated with the purge mode, the first and second purge air portions flow to and mix within mix chamber 30 and the resulting combination of air and solvent is emitted through spray orifice 32. Shuttles 62*a*, 62*b* prevent the first and second base component materials from flowing into mix chamber 30 with spray applicator 12 in the purge mode. Shuttles 62*a*, 62*b* can also be referred to as needles.

Figure 3A:
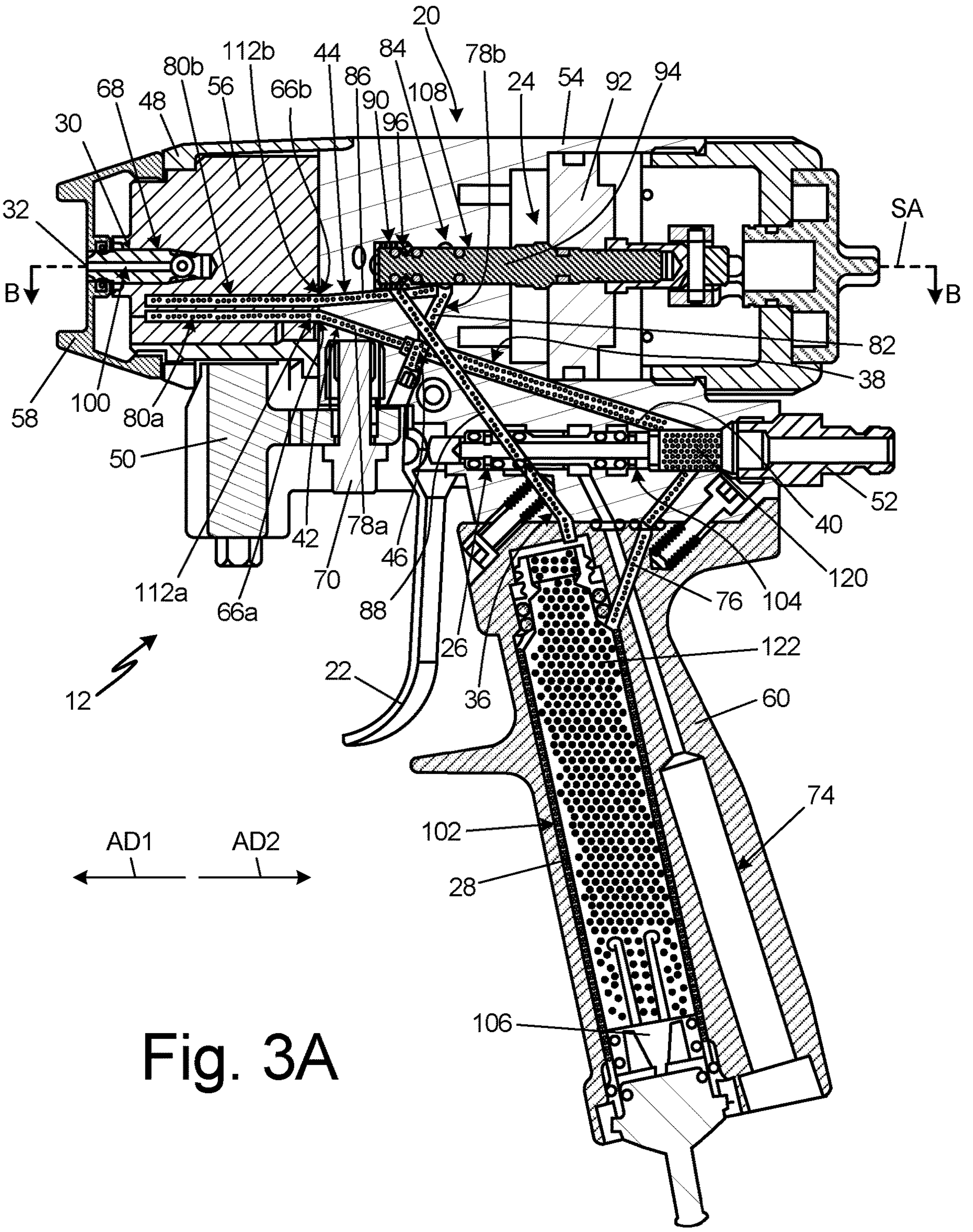
FIG. 3A is a cross-sectional view of a spray applicator taken along line A-A in FIG. 3B showing the spray applicator in a spray mode.
Figure 3B:
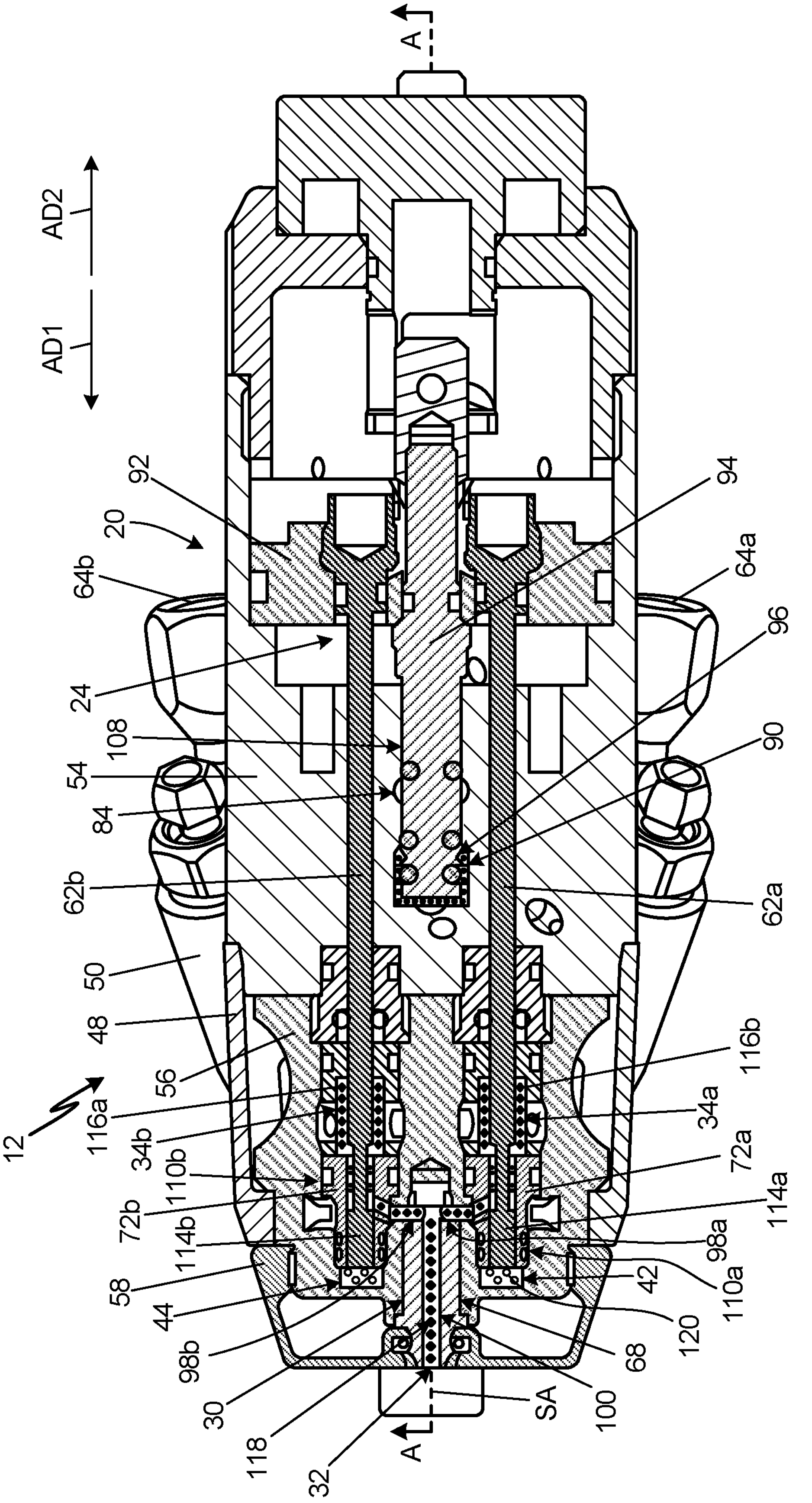
FIG. 3B is a cross-sectional view of a spray applicator taken along line B-B in FIG. 3A showing the spray applicator in the spray mode.
Figure 4A:
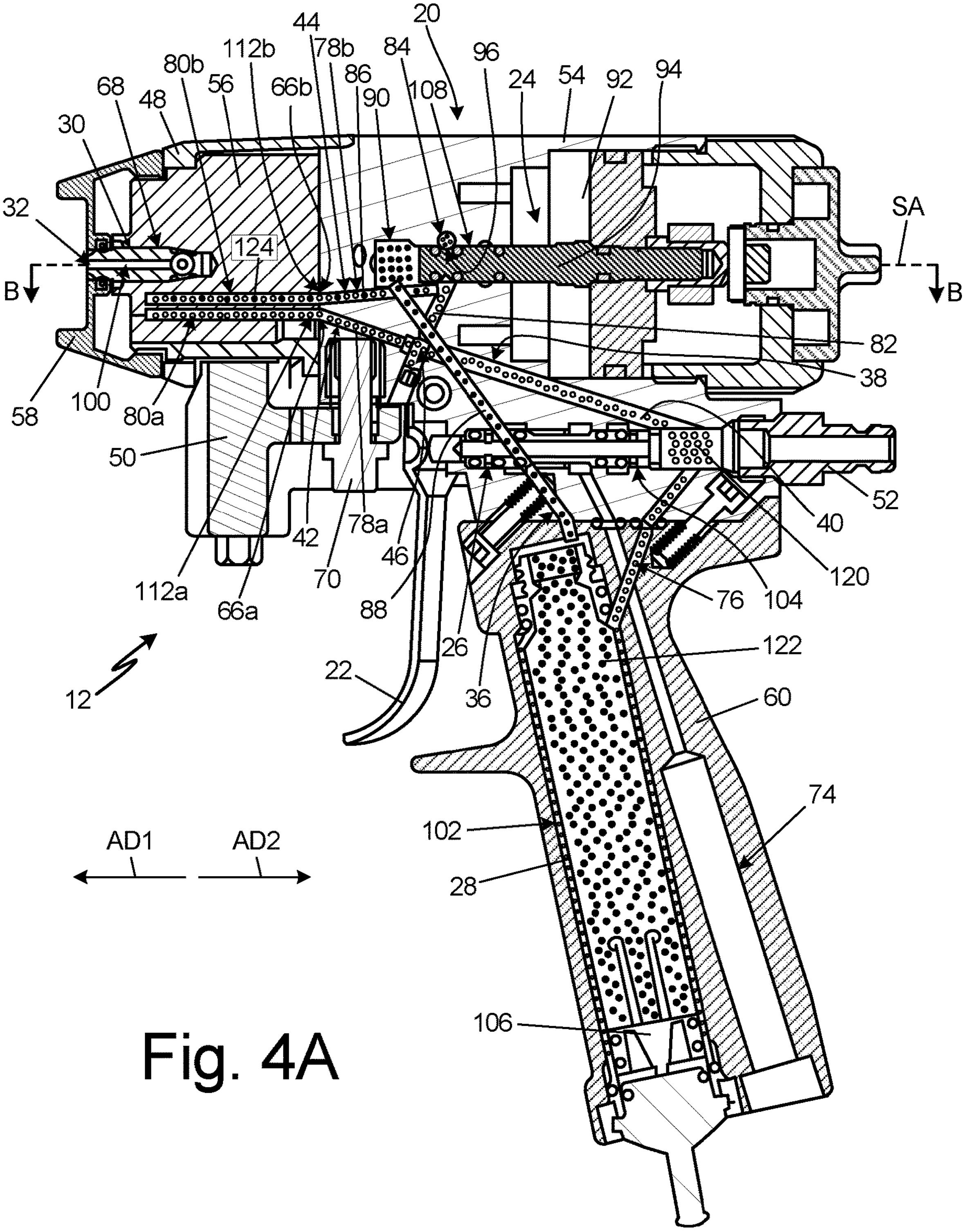
FIG. 4A is a cross-sectional view of a spray applicator taken along line A-A in FIG. 4B showing the spray applicator in a purge mode.
Figure 4B:
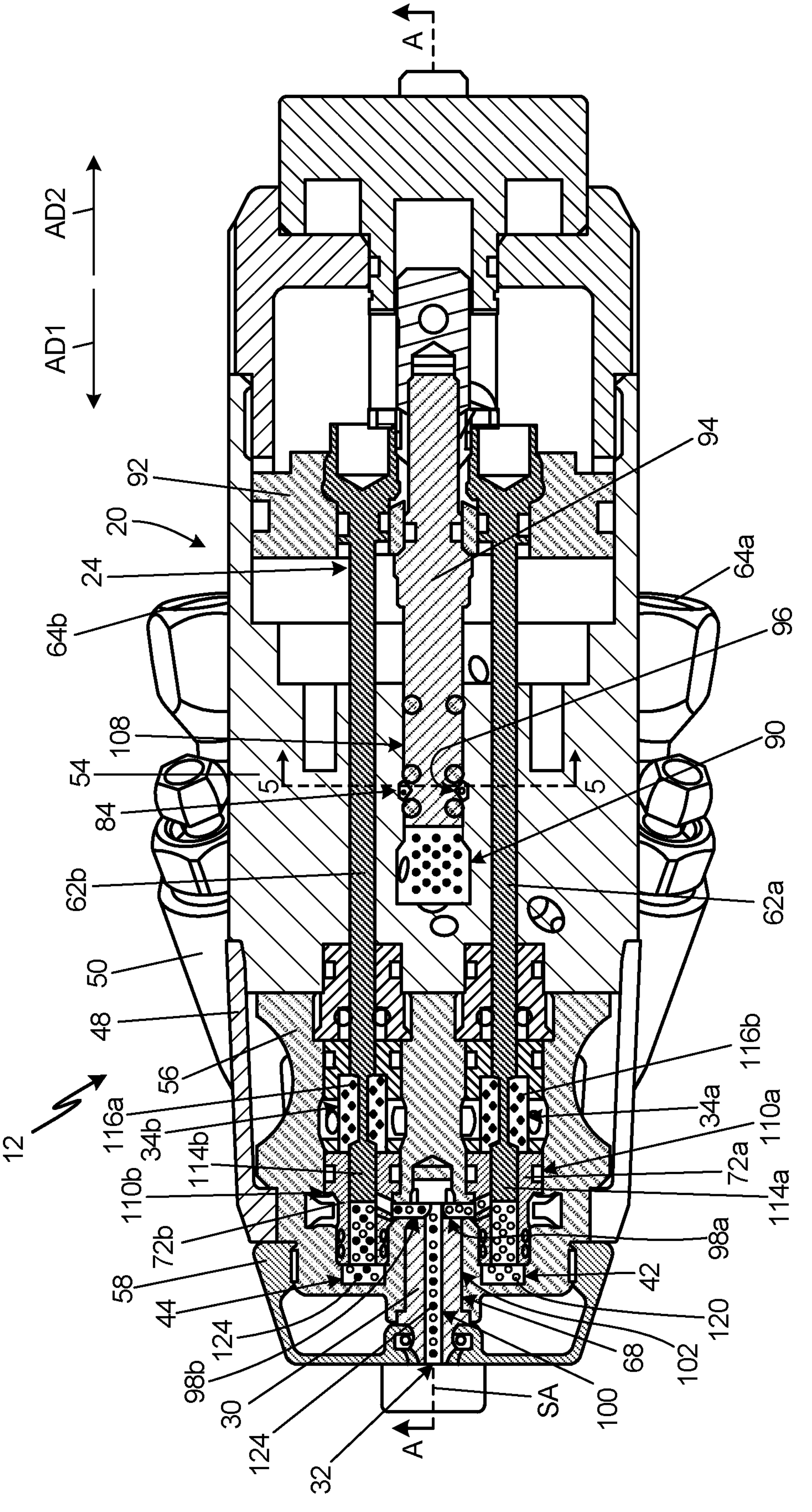
FIG. 4B is a cross-sectional view of a spray applicator taken along line B-B in FIG. 4A showing the spray applicator in a purge mode.

FIG. 3A is a cross-sectional, partially schematic view spray applicator 12 taken along line A-A in FIG. 3B and showing spray applicator 12 in a spray mode. FIG. 3B is a cross-sectional, partially schematic view taken along line B-B in FIG. 3A and showing spray applicator 12 in the spray mode. FIG. 4A is a cross-sectional, partially schematic view spray applicator 12 taken along line A-A in FIG. 4B and showing spray applicator 12 in a purge mode. FIG. 4B is a cross-sectional, partially schematic view taken along line B-B in FIG. 4A and showing spray applicator 12 in the purge mode. FIGS. 3A-4B will be discussed together.

Spray applicator 12 includes body 20, trigger 22, spray valve 24, control valve 26, solvent cartridge 28, mix chamber 30, spray orifice 32, cover 48, material manifold 50, air receiver 52, seal cartridges 72*a*, 72*b*, and exhaust 74. Body 20 includes support housing 54, fluid cartridge 56, retainer cap 58, and handle 60. Solvent pathway 36, air pathway 38, material pathways 34*a*, 34*b*, and pressurization passage 76 are shown. Common passage 40, first passage 42, and second passage 44 of air pathway 38 are shown. First passage 42 includes upstream portion 78*a* and downstream portion 80*a*. Second passage 44 includes upstream portion 78*b* and downstream portion 80*b*. Upstream portion 78*b* includes inlet portion 82, dosing chamber 84, and outlet portion 86. Solvent pathway 36 includes flow passage 88 and holding chamber 90. Spray valve 24 includes shuttles 62*a*, 62*b*, piston head 92, and dosing rod 94. Dosing rod 94 includes groove 96. Mix chamber 30 includes spray orifice 32, inlet ports 98*a*, 98*b*, and mixing bore 100. Handle 60 includes receiving chamber 102.

Spray applicator 12 is configured to receive separate flows of first and second base component materials 116*a*, 116*b* and to emit a plural component material 118 formed by the first and second base component materials mixing within mix chamber 30. Body 20 supports other components of spray applicator 12. Fluid cartridge 56 is mounted to support housing 54. Mix chamber 30 is supported by fluid cartridge 56. Support housing 54 can also be referred to as an air housing or air head as compressed air, but not the base component materials, flows within support housing 54. Fluid cartridge 56 includes flowpaths for both the liquid base component materials and the compressed purge air.

Spray valve 24 and control valve 26 are at least partially disposed within support housing 54 and are supported by support housing 54. Trigger 22 extends relative to body 20 and is pivotably supported by body 20. Trigger 22 is spaced from handle 60 and can be actuated by the hand of the user that grasps handle 60. Trigger 22 interfaces with a valve member of control valve 26 to actuate spray applicator 12 between the spray mode and the purge mode.

Handle 60 extends from support housing 54. Handle 60 is configured to be grasped by a hand of the user to support and manipulate spray applicator 12. Receiving chamber 102 extends into handle 60 from a lower end of handle 60. Solvent cartridge 28 is mountable within receiving chamber 102. For example, solvent cartridge 28 can be mounted by interfaced threading, among other options. In some examples, solvent cartridge 28 can be connected and disconnected by a quarter turn (e.g., 90-degree rotation), among other options. Exhaust 74 extends through handle 60 and terminates in a port disposed at the lower end of handle 60. Exhaust 74 is configured to exhaust air from spray valve 24 as spray valve 24 transitions between the positions associated with the spray and purge modes.

Material manifold 50 is mounted to spray applicator 12. In the example shown, material manifold 50 interfaces with support housing 54 and fluid cartridge 56. Material manifold 50 is fluidly connected to fluid cartridge 56 to provide the first and second base component materials to the portions of material pathways 34*a*, 34*b* within fluid cartridge 56. Material manifold 50 is fixed to body 20 by fastener 70 extending into through the body of material manifold 50 into air housing.

Air receiver 52 is mounted to body 20. More specifically, air receiver 52 is mounted to support housing 54. Air receiver 52 is a fitting configured to connect to air supply 18 to provide compressed air 120 to spray applicator 12. In the example shown, air receiver 52 is mounted at an end of valve bore 104. The compressed air 120 provided by air receiver 52 is configured to displace spray valve 24 between the spray state and the purge state, pressurize receiving chamber 102, and form the purge air.

Pressurization passage 76 is extends between valve bore 104 and receiving chamber 102. Pressurization passage 76 is configured to provide compressed air 120 to receiving chamber 102. The compressed air 120 pressurizes receiving chamber 102 and acts on piston 106 of solvent cartridge 28 to cause piston 106 of solvent cartridge 28 to drive solvent 122 out of solvent cartridge 28 and into spray applicator 12. Solvent pathway 36 extends from receiving chamber 102 to rod bore 108 to provide solvent to dosing rod 94. More specifically, flow passage 88 extends from receiving chamber 102, through handle 60, and into support housing 54. Flow passage 88 extends from receiving chamber 102 to holding chamber 90. Holding chamber 90 forms a downstream end of solvent pathway 36. In the example shown, holding chamber 90 is formed as a portion of rod bore 108.

Air pathway 38 is configured to route the purge air portion of the compressed air to mix chamber 30. Common passage 40 extends downstream from valve bore 104. Common passage 40 branches into first passage 42 and second passage 44 at intersection 46. Intersection 46 is disposed within support housing 54, in the example shown. First passage 42 extends from intersection 46 to fluid bore 110*a*. A first purge air portion flows to fluid bore 110*a* through first passage 42. Second passage 44 extends from intersection 46 to fluid bore 110*b*. A second purge air portion flows to fluid bore 110*b* through second passage 44. First passage 42 is fluidly isolated from second passage 44 such that the first and second purge air portions do not mix downstream of intersection 46 until meeting within mix chamber 30.

Upstream portion 78*a* is a portion of first passage 42 formed within support housing 54. Upstream portion 78*a* extends from intersection 46 through support housing 54 to outlet aperture 66*a*. Downstream portion 80*a* is a portion of first passage 42 formed within fluid cartridge 56. Downstream portion 80*a* extends to fluid bore 110*a* from inlet aperture 112*a* formed in fluid cartridge 56. Inlet aperture 112*a* is formed in a face of fluid cartridge 56 opposite the face that cavity 68 extends into.

Upstream portion 78*b* is a portion of second passage 44 formed within support housing 54. Upstream portion 78*b* extends from intersection 46 through support housing 54 to outlet aperture 66*b*. Upstream portion 78*b* is formed by inlet portion 82, dosing chamber 84, and outlet portion 86. Dosing chamber 84 is formed as a radially enlarged portion of rod bore 108. In the example shown, dosing chamber 84 is an annular chamber that extends around dosing rod 94. Dosing chamber 84 is disposed axially between holding chamber 90 and the chamber that piston head 92 of spray valve 24 reciprocates within. The second purge air portion flows around dosing rod 94 between intersection 46 and fluid bore 110*b*. Inlet portion 82 extends from intersection 46 to dosing chamber 84. Inlet portion 82 provides the second purge air portion to dosing chamber 84. Inlet portion 82 extends vertically to dosing chamber 84. Outlet portion 86 extends from dosing chamber 84 to outlet aperture 66*b*. Outlet portion 86 extends vertically downward (in the downstream direction) from dosing chamber 84 to outlet aperture 66*b*. Outlet portion 86 extending vertically downward from dosing chamber 84 inhibits backflow of solvent to dosing chamber 84 and upstream from dosing chamber 84. As discussed in more detail below, inlet portion 82 intersects with dosing chamber 84 at a location vertically above the location that outlet portion 86 intersects with dosing chamber 84, further preventing solvent from flowing upstream from dosing chamber 84. Downstream portion 80*b* is a portion of second passage 44 formed within fluid cartridge 56. Downstream portion 80*b* extends to fluid bore 110*b* from inlet aperture 112*b* formed in fluid cartridge 56. Inlet aperture 112*b* is formed in a face of fluid cartridge 56 opposite the face that cavity 68 extends into.

The second purge air portion is configured to entrain a dose of solvent within dosing chamber 84 and to carry the entrained solvent 124 downstream to fluid bore 110*b* and thus to mix chamber 30. The entrained solvent 124 is carried by the second purge air portion from dosing chamber 84, through outlet portion 86 and downstream portion 80*b*, and to fluid bore 110*b*.

Control valve 26 is at least partially disposed within body 20. More specifically, the valve member of control valve 26 is disposed within valve bore 104 formed in support housing 54. Control valve 26 controls the flow of compressed air 120 to spray valve 24 to actuate spray valve 24 between the positions associated with the spray and purge modes. Control valve 26 directs compressed air 120 to a first chamber on a first axial side of piston head 92 to displace the moving components of spray valve 24 (e.g., shuttles 62*a*, 62*b*, piston head 92, and dosing rod 94) in first axial direction AD1 and to the position shown in FIGS. 3A and 3B to place spray applicator 12 in the spray mode. Control valve 26 directs compressed air 120 to a second chamber on a second axial side of piston head 92 to displace the moving components of spray valve 24 in second axial direction AD2 and to the position shown in FIGS. 4A and 4B to place spray applicator 12 in the purge mode. While spray applicator 12 is described as being pneumatically driven between the spray and purge modes, it is understood that spray applicator 12 can be configured in any desired manner suitable for actuating spray applicator 12 between the spray and purge modes. For example, trigger 22 can, in some examples, mechanically displace the moving components of spray valve 24, among other options.

Spray valve 24 is at least partially disposed within body 20. Piston head 92 is disposed within body 20. Dosing rod 94 is connected to piston head 92 to move with piston head 92. In the example shown, dosing rod 94 is disposed on and coaxial with spray axis SA. Dosing rod 94 reciprocates along spray axis SA. It is understood, however, that dosing rod 94 can project from any desired portion of piston head 92. Dosing rod 94 can be connected to piston head 92 in any desired manner, such as by interfacing threading among other options. Dosing rod 94 extends from piston head 92 into rod bore 108. Groove 96 is formed on an end of dosing rod 94 opposite piston head 92. In the example shown, groove 96 extends annularly about dosing rod 94. In the example shown, groove 96 is shallower than the seal grooves formed in dosing rod 94 that support elastomer seals on dosing rod 94 that seal against the portion of support housing 54 defining rod bore 108. Groove 96 is disposed axially between two of the seal grooves. Dosing rod 94 is configured such that groove 96 is disposed within holding chamber 90 with spray applicator 12 in the spray state (FIGS. 3A and 3B) and such that groove 96 is disposed within dosing chamber 84 with spray applicator 12 in the purge state (FIGS. 4A and 4B). Groove 96 is configured to pick up a dose volume of solvent 122 from holding chamber 90 and transfer that solvent 122 to dosing chamber 84 such that the solvent 122 is entrained in the second purge air portion flowing through second passage 44. Dosing chamber 84 is fluidly isolated from holding chamber 90 throughout operation. In the example shown, dosing chamber 84 is fluidly isolated from holding chamber 90 by the dynamic sealing interface between dosing rod 94 and support housing 54.

Shuttles 62*a*, 62*b* are connected to piston head 92 to move with piston head 92. Shuttles 62*a*, 62*b* extend in first axial direction AD1 from piston head 92. Shuttles 62*a*, 62*b* extend through support housing 54 and into fluid cartridge 56.

In the example shown, fluid cartridge 56 is mounted to support housing 54 and can be removed from support housing 54. It is understood, however, that in some examples fluid cartridge 54 can be formed with support housing 54. Seal cartridges 72*a*, 72*b* are disposed within fluid bores 110*a*, 110*b*, respectively. Fluid bores 110*a*, 110*b* are formed within fluid cartridge 56. Heads 114*a*, 114*b* of shuttles 62*a*, 62*b* interface with seal cartridges 72*a*, 72*b*, respectively, to control the flows of base component materials and purge air to mix chamber 30. Cavity 68 is disposed within fluid cartridge 56 and mix chamber 30 is disposed within cavity 68. Inlet ports 98*a*, 98*b* extend through mix chamber 30 to mixing bore 100. Mixing bore 100 can be disposed coaxially with spray axis SA. Mixing bore 100 extends to spray orifice 32.

During operation, spray applicator 12 is placed in the spray mode to generate and emit the plural component material 118 from spray orifice 32. Spray applicator 12 is placed in the purge mode to emit purge air from spray orifice 32. To place spray applicator 12 in the spray mode, the user depresses trigger 22, thereby causing control valve 26 to route driving air to the chamber that piston head 92 is disposed within. The driving air exerts force on piston head 92 to displace the moving components of spray valve 24 in first axial direction AD1 to the positions shown in FIGS. 3A and 3B.

With shuttles 62*a*, 62*b* in the positions shown in FIGS. 3A and 3B, heads 114*a*, 114*b* of shuttles 62*a*, 62*b* are disposed on a first axial side of the inlet ports 98*a*, 98*b* and seal against seal cartridges 72*a*, 72*b*. For example, heads 114*a*, 114*b* can interface directly with the bodies of seal cartridges 72*a*, 72*b* or with seal members (e.g., elastomer sealing members, such as o-rings) supported by seal cartridges 72*a*, 72*b* or heads 114*a*, 114*b*. The interfaces between heads 114*a*, 114*b* and seal cartridges 72*a*, 72*b* fluidly isolate the first and second purge air flows from mix chamber 30 while the first and second base component material flows are fluidly connected to mix chamber 30. The first base component material can flow through seal cartridge 72*a* and enter mix chamber 30 through inlet port 98*a*. The second base component material can flow through seal cartridge 72*b* and enter mix chamber 30 through inlet port 98*b*. The first and second base component materials interact within mixing bore 100 to form the plural component material that is emitted through spray orifice 32.

Spray applicator 12 is detriggered (e.g., the user releases trigger 22) to cause spray applicator 12 to transition from the spray mode to the purge mode shown in FIGS. 4A and 4B. Control valve 26 shifts position to direct the driving air to the chamber that piston head 92 is disposed within. The driving air exerts force on piston head 92 to displace the moving components of spray valve 24 in second axial direction AD2, placing the spray applicator 12 in the spray mode shown in FIGS. 4A and 4B. Control valve 26 connects a portion of the chamber that piston head 92 is disposed within to exhaust 74 to exhaust the driving air that transitioned spray applicator 12 to the spray mode as spray applicator 12 transitions to the purge mode.

With shuttles 62*a*, 62*b* in the positions shown in FIGS. 4A and 4B, heads 114*a*, 114*b* are disposed on a second axial side of inlet ports 98*a*, 98*b* and seal against seal cartridges 72*a*, 72*b*. For example, heads 114*a*, 114*b* can interface directly with the bodies of seal cartridges 72*a*, 72*b* or with seal members (e.g., elastomer sealing members, such as o-rings) supported by seal cartridges 72*a*, 72*b* or heads 114*a*, 114*b*. The interfaces between heads 114*a*, 114*b* and seal cartridges 72*a*, 72*b* fluidly connect the first and second purge air flows with mix chamber 30 while the first and second base component material 116*a*, 116*b* flows are fluidly isolated from mix chamber 30. The first purge air portion flows through seal cartridge 72*a* and enters mix chamber 30 through inlet port 98*a*. The second pneumatic purge portion, including the entrained solvent 124, flows through seal cartridge 72*b* and enters mix chamber 30 through inlet port 98*b*. The first and second pneumatic purge portions interact within mixing bore 100 and are emitted through spray orifice 32.

Dosing rod 94 is pulled in second axial direction AD2 by piston head 92 as spray applicator 12 transitions from the spray mode to the purge mode. Groove 96 is disposed within holding chamber 90 and exposed to the solvent with spray applicator 12 in the spray mode. As spray applicator 12 transitions to the purge mode, a dose of the solvent 122 is retained within groove 96 and pulled by groove 96 in second axial direction AD2 and towards dosing chamber 84. The dynamic sealing interface between dosing rod 94 and body 20 prevents the solvent 122 within groove 96 from backflowing to holding chamber 90 as spray applicator 12 transitions to the purge mode. Dosing rod 94 continues to shift in second axial direction AD2 and groove 96 is fluidly connected to dosing chamber 84 and provides the dose of solvent 122 to dosing chamber 84. The second purge air portion entrains the solvent and carries the entrained solvent 124 downstream from dosing chamber 84. The second purge air portion carries the entrained solvent 124 through outlet portion 86, downstream portion 80*b*, seal cartridge 72*b*, and inlet port 98*b* to mixing bore 100. The second purge air portion, including the entrained solvent 124, combines with the first purge air portion within mixing bore 100 and is emitted through spray orifice 32. The solvent inhibits curing of the plural component material within mix chamber 30, preventing curing within mix chamber 30 and preventing plugging of mix chamber 30. In the example shown, spray applicator 12 is configured such that a dose of solvent is provided to the second purge air portion and thus downstream to mix chamber 30 each time spray applicator 12 is detriggered.

Both of the first base component material and the first purge air portion flow through a common portion of seal cartridge 72*a* and through inlet port 98*a*. As such, seal cartridge 72*a* and inlet port 98*a* define portions of both material pathway 34*a* and first passage 42. Both of the second base component material and the second purge air portion flow through a common portion of seal cartridge 72*b* and inlet port 98*b*. As such, seal cartridge 72*b* and inlet port 98*b* define portions of both material pathway 34*b* and second passage 44. The solvent is carried to mix chamber 30 by the second purge air portion. The first purge air portion is fluidly isolated from the solvent at locations upstream of mix chamber 30. In the example shown, the first and second purge air portions are sourced from the same supply of compressed air upstream of spray applicator 12 (e.g., from air supply 18) and from the same supply path within spray applicator 12 (e.g., common passage 40). The pneumatic pressure is balanced across the first and second purge air portions such that the first purge air portion is prevented from crossing over and flowing through inlet port 98*b* and such that the second purge air portion is prevented from crossing over and flowing through inlet port 98*a*. The balanced pressure prevents the solvent carried by the second purge air portion from flowing to inlet port 98*a* and upstream from inlet port 98*a*, such as into seal cartridge 72*a* or other portions of the material pathway 34*a* or first passage 42.

Spray applicator 12 provides significant advantages. Solvent is carried to mix chamber 30 by the second purge air portion and not by the first purge air portion. The solvent is thereby isolated from the first portion 42 of air pathway 38 at all locations upstream of mix chamber 30. The solvent is thereby isolated from the first base component material. Spray applicator 12 is configured such that a moisture-sensitive one of the base component materials is the first base component material. For example, the first base component material can be isocyanate, which is moisture-sensitive and cures on exposure to liquid, such as the solvent. Such curing can form crystals that can cause scoring, clogging, or otherwise adversely impact spraying and soft seals. Flowing the solvent into mix chamber 30 through the same port as the second, non-moisture sensitive base component material (e.g., resin) prevents any mixing of solvent and moisture-sensitive material upstream of mix chamber 30, thereby preventing undesired mixing between solvent and the moisture-sensitive base component material. Preventing mixing of solvent with the moisture-sensitive base component material lengthens the operational life of fluid cartridge 56 and the seals within fluid cartridge 56, providing cost and material savings.

Sourcing the first and second purge air portions from common passage 40 balances the air pressure between the first and second purge air portions, preventing cross-over of the solvent from fluid bore 110*b* to fluid bore 110*a*, further isolating the moisture-sensitive base component material from the solvent. The portions of first passage 42 and second passage 44 within fluid cartridge 56 (e.g., downstream portions 80*a*, 80*b*) are fluidly isolated at all locations within fluid cartridge 56 and upstream of mix chamber 30. Fluidly isolating downstream portion 80*a* from downstream portion 80*b* prevents mixing of the base component materials within air pathway 38 in the event of leakage, thereby preventing formation of the plural component material within air pathway 38, allowing fluid cartridge 56 to be cleaned and reused.

Dosing rod 94 provides a dose of solvent each time spray applicator 12 is detriggered. As such, a dose of solvent is provided to the purge air each time spray applicator 12 transitions to the purge mode. he solvent dissolves the plural component material and lengthens the reaction time between the base component materials. Providing solvent to the purge air, and thus to mix chamber 30, each time spray applicator 12 transitions to the purge mode prevents undesired curing of plural component material within mix chamber 30, preventing clogging. Providing the dose of solvent each time spray applicator 12 transitions to the purge mode thereby provides longer operational life, provides cost savings, decreases downtime, and increases operational efficiency, among other advantages.

Figure 5:
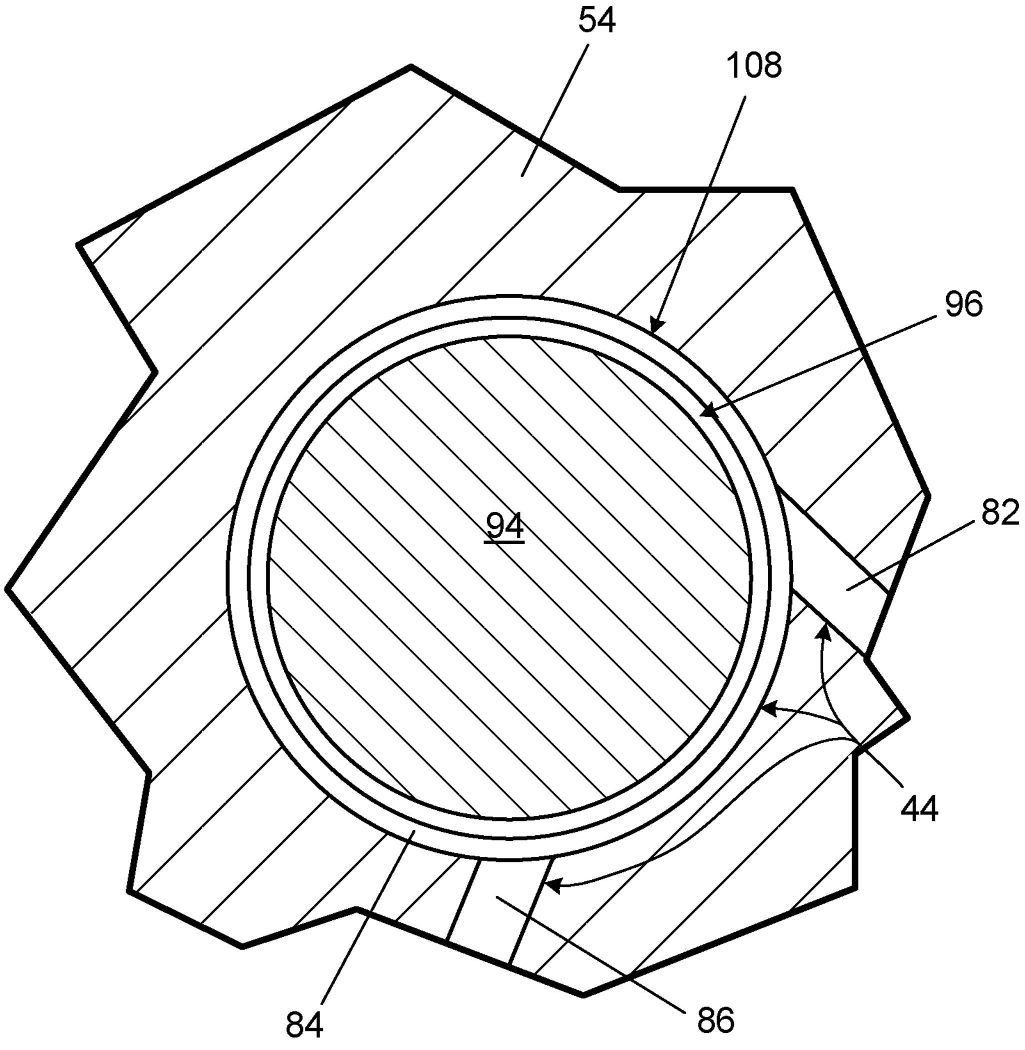
FIG. 5 is an enlarged cross-sectional view of detail 5 in FIG. 4B.

FIG. 5 is an enlarged cross-sectional view of a portion of spray applicator 12 taken along line 5-5 in FIG. 4B. Support housing 54 of body 20, second passage 44, dosing rod 94, and rod bore 108 are shown. Groove 96 in dosing rod 94 is shown. Inlet portion 82, dosing chamber 84, and outlet portion 86 of second passage 44 are shown.

Spray applicator 12 is in a purge state in FIG. 5 such that groove 96 is disposed within dosing chamber 84. Inlet portion 82 extends to dosing chamber 84 to provide the second purge air portion to dosing chamber 84. The second purge air portion entrains the solvent within dosing chamber 84 and carries the entrained solvent downstream through outlet portion 86. In the example shown, inlet portion 82 intersects dosing chamber 84 at a location vertically higher than the location where outlet portion 86 intersects dosing chamber 84. The relative positions where the inlet portion 82 and outlet portion 86 interface with dosing chamber 84 inhibit solvent from flowing upstream from dosing chamber 84 to intersection 46 (FIGS. 3A and 4A) where the solvent could be picked up by the first purge air portion. The relative positions inhibit the solvent from draining to first passage 42 when the pneumatic pressure is removed from spray applicator 12.

In the example shown, inlet portion 82 intersects dosing chamber 84 in a top half of dosing chamber 84 (e.g., vertically above spray axis SA) and outlet portion 86 intersects dosing chamber 84 in a bottom half of dosing chamber 84 (e.g., vertically below spray axis SA). In some examples, both of the inlet portion 82 and outlet portion 86 intersect dosing chamber 84 in the same vertical half of dosing chamber 84 (e.g., both the inlet portion 82 and outlet portion 86 intersect dosing chamber 84 in the top or bottom half). In the example shown, outlet portion 86 is disposed at a bottom dead center position of dosing chamber 84. Positioning outlet portion 86 at the bottom dead center of dosing chamber 84 assists in draining solvent after operation.

The relative positioning of inlet portion 82 and outlet portion 86 provides significant advantages. Outlet portion 86 extends from dosing chamber 84 at a location vertically below inlet portion 82, inhibiting passage of solvent upstream through inlet portion 82. The relative positioning prevents draining of solvent to first passage 42, where the solvent could be carried downstream to interact with the moisture-sensitive base component material on resumption of spraying. The relative positioning thereby inhibits undesired curing of the moisture-sensitive base component material. In addition, the relative positioning encourages transfer of the full volume of the dose of solvent out of dosing chamber 84 during operation due to gravity assisting the outflow of solvent. The relative positioning allows for less solvent to be used in each dose, providing material and costs savings. In addition, solvent is prevented from pooling within dose chamber 84, preventing old solvent from remaining in spray applicator 12 for extended periods of non-use.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray apparatus, the apparatus comprising:

a sprayer body;

a solvent reservoir configured to hold a solvent;

a mix chamber supported by the sprayer body, the mix chamber including a mixing bore extending to a spray orifice;

a spray valve supported by the sprayer body, wherein the spray valve is actuatable between a first position associated with a spray mode of the spray apparatus and a second position associated with a purge mode of the spray apparatus; and a purge air pathway extending through the sprayer body, the purge air pathway comprising:

a common passage extending to an intersection;

a first passage extending downstream from the intersection to a first inlet port of the mix chamber that fluidly connects the first passage and the mixing bore, the first passage configured to provide a first portion of purge air into the mix chamber through the first inlet port; and a second passage extending downstream from the intersection to a second inlet port of the mix chamber that fluidly connects the second passage and the mixing bore, the second passage configured to provide a second portion of purge air into the mix chamber through the second inlet port;

wherein only a first one of the first passage and the second passage is fluidly connected to the solvent reservoir to receive the solvent from the solvent reservoir; and wherein a flow of the compressed air through the purge air pathway is fluidly disconnected from the mix chamber with the spray apparatus in the spray mode, and the flow of compressed air through the purge air pathway is fluidly connected to the mix chamber with the spray apparatus in the purge mode.

2. The spray apparatus of claim 1, further comprising:

a first material pathway extending to the first inlet port, the first material pathway configured to provide a first base component material to the mix chamber;

a second material pathway extending to the second inlet port, the second material pathway configured to provide a second base component material to the mix chamber.

3. The spray apparatus of claim 2, wherein the second passage is configured to receive the solvent from the solvent reservoir, wherein the first base component material is isocyanate, and wherein the second base component material is a resin.

4. The spray apparatus of claim 1, wherein the solvent reservoir is formed by a solvent cartridge removably mountable to the sprayer body.

5. The spray apparatus of claim 4, wherein the sprayer body includes a handle defining a receiving chamber, and wherein the solvent cartridge is mountable within the receiving chamber.

6. The spray apparatus of claim 1, wherein the spray valve comprises:

a piston head;

a first shuttle extending from the piston head to a first fluid bore formed in the sprayer body;

a second shuttle extending from the piston head to a second fluid bore formed in the sprayer body;

wherein the first shuttle fluidly disconnects the first passage from the first inlet port with the spray apparatus in the spray mode and fluidly connects the first passage with the first inlet port with the spray apparatus in the purge mode; and wherein the second shuttle fluidly disconnects the second passage from the second inlet port with the spray apparatus in the spray mode and fluidly connects the second passage with the second inlet port with the spray apparatus in the purge mode.

7. The spray apparatus of claim 6, wherein the spray valve further comprises:

a dosing rod connected to the piston head and extending into a rod bore formed within the sprayer body;

wherein a groove is formed on the dosing rod;

wherein the dosing rod is configured such that the groove is disposed in a holding chamber fluidly connected to the solvent reservoir with the spray apparatus in the spray mode and such that the groove is disposed in a dosing chamber with the spray apparatus in the purge mode; and wherein the second passage extends through the dosing chamber.

8. The spray apparatus of claim 1, wherein the second passage extends through a dosing chamber at a location downstream of the intersection such that the second purge air portion entrains solvent within the dosing chamber.

9. The spray apparatus of claim 8, wherein the sprayer body comprises:

a support housing; and a fluid cartridge mounted to the support housing;

wherein the intersection is formed within the support housing and the mix chamber is at least partially disposed within a cavity formed in the fluid cartridge.

10. The spray apparatus of claim 9, wherein:

the first passage includes a first upstream portion extending from the intersection to a first outlet aperture formed in the support housing, and the first passage includes a first downstream portion extending from a first inlet aperture formed in the fluid cartridge to the mix chamber; and the second passage includes a second upstream portion extending from the intersection to a second outlet aperture formed in the support housing, and the second passage includes a second downstream portion extending from a second inlet aperture formed in the fluid cartridge to the mix chamber.

11. The spray apparatus of claim 10, wherein the second upstream portion includes an inlet passage extending from the intersection to the dosing chamber and a downstream passage extending from the dosing chamber to the second outlet aperture.

12. The spray apparatus of claim 11, wherein the inlet passage intersects the dosing chamber at a first location and the outlet passage intersects the dosing chamber at a second location, and wherein the first location is disposed vertically above the second location.

13. The spray apparatus of claim 12, wherein the second location is in a vertically lower half of the dosing chamber.

14. The spray apparatus of claim 13, wherein the second location is at a bottom dead center of the dosing chamber.

15. The spray apparatus of claim 8, wherein a dosing rod is connected to a valve member of the spray valve to reciprocate with the valve member, wherein the dosing rod includes a groove, wherein the groove is disposed in a holding chamber fluidly connected to the solvent reservoir with the spray apparatus in the spray mode, and wherein the groove is disposed in the dosing chamber with the spray apparatus in the purge mode.

16. The spray apparatus of claim 1, further comprising:

a valve bore formed in the sprayer body; and a control valve at least partially disposed within the valve bore, wherein the control valve is configured to direct compressed air to the spray valve to drive the spray valve between the first position and the second position;

wherein the purge air pathway extends from the valve bore.

17. The spray apparatus of claim 1, wherein the mix chamber is a stationary mix chamber.

18. A sprayer apparatus comprising:

a sprayer body;

a mix chamber supported by the sprayer body, the mix chamber including a first inlet bore, a second inlet bore, and a mixing bore extending to an outlet orifice, the mixing bore configured to receive a first material from the first inlet bore and a second material from the second inlet bore;

a first material pathway extending through the sprayer body to the first inlet bore;

a second material pathway extending through the sprayer body to the second inlet bore;

a purge air pathway extending through the sprayer body, the purge air pathway comprising:

a common passage configured to receive a supply of compressed air;

a first passage extending from the common passage to the first inlet bore of the mix chamber, the first passage configured to provide a first portion of the compressed air to the mix chamber through the first inlet bore; and a second passage extending from the common passage to the second inlet bore of the mix chamber, the second passage configured to provide a second portion of the compressed air to the mix chamber through the second inlet bore;

wherein the first passage is fluidly isolated from the second passage at all locations of the purge air pathway between an intersection at which the first passage diverges from the second passage and the mix chamber such that a flow through the first passage reconverges with a flow through the second passage in the mixing bore;

a solvent pathway formed in the sprayer body, the solvent pathway extending from a solvent reservoir to a dosing chamber; and a dosing rod supported by the sprayer body, wherein the dosing rod is configured to provide a dose volume of the solvent to a dosing chamber from the holding chamber;

wherein the second passage extends through the dosing chamber at a location downstream of the intersection.

19. A method of spraying, the method comprising:

placing a spray applicator in a spray mode, a spray valve of the spray applicator fluidly connecting a first material pathway with a mix chamber and fluidly connecting a second material pathway with the mix chamber with the spray applicator in the spray mode;

emitting, by the spray applicator, a plural component material formed within the mix chamber by a first base component material provided to the mix chamber by the first material pathway and a second base component material provided to the mix chamber by the second material pathway;

shifting the spray valve from a first position associated with the spray mode to a second position associated with a purge mode;

flowing, with the spray applicator in the purge mode, a first portion of purge air to the mix chamber through a first purge air pathway and into the mix chamber through a first inlet bore of the mix chamber and a second portion of purge air to the mix chamber through a second purge air pathway and into the mix chamber through a second inlet bore of the mix chamber; and entraining a dose volume of solvent within the second portion of purge air at a location upstream of the mix chamber and downstream of an intersection where the first purge air pathway splits from the second purge air pathway, such that the dose volume of solvent is provided to the mix chamber through only the second purge air pathway and such that the dose volume of solvent enters into the mix chamber through only the second inlet port.

20. A spray apparatus, the apparatus comprising:

a sprayer body;

a solvent reservoir configured to hold a solvent;

a mix chamber supported by the sprayer body;

a spray valve supported by the sprayer body, wherein the spray valve is actuatable between a first position associated with a spray mode and a second position associated with a purge mode; and a purge air pathway extending through the sprayer body, the purge air pathway comprising:

a first passage extending to a first inlet port of the mix chamber, the first passage configured to provide a first portion of purge air into the mix chamber through the first inlet port; and a second passage fluidly isolated from the first passage and extending to a second inlet port of the mix chamber, the second passage configured to provide a second portion of purge air to the mix chamber through the second inlet port;

wherein only one of the first passage and the second passage is configured to receive the solvent from the solvent reservoir;

wherein the spray valve comprises:

a piston head;

a first shuttle extending from the piston head to a first fluid bore formed in the sprayer body;

a second shuttle extending from the piston head to a second fluid bore formed in the sprayer body; and wherein:

the first shuttle fluidly disconnects the first passage from the first inlet port with the spray apparatus in the spray mode and fluidly connects the first passage with the first inlet port with the spray apparatus in the purge mode; and the second shuttle fluidly disconnects the second passage from the second inlet port with the spray apparatus in the spray mode and fluidly connects the second passage with the second inlet port with the spray apparatus in the purge mode.

21. A spray apparatus, the apparatus comprising:

a sprayer body;

a solvent reservoir configured to hold a solvent;

a mix chamber supported by the sprayer body;

a spray valve supported by the sprayer body, wherein the spray valve is actuatable between a first position associated with a spray mode and a second position associated with a purge mode; and a purge air pathway extending through the sprayer body, the purge air pathway comprising:

a first passage extending to a first inlet port of the mix chamber, the first passage configured to provide a first portion of purge air into the mix chamber through the first inlet port; and a second passage fluidly isolated from the first passage and extending to a second inlet port of the mix chamber, the second passage configured to provide a second portion of purge air to the mix chamber through the second inlet port;

wherein only one of the first passage and the second passage is configured to receive the solvent from the solvent reservoir;

wherein the purge air pathway further comprises a common passage extending to an intersection;

wherein the first passage and the second passage extend downstream from the intersection; and wherein the second passage extends through a dosing chamber at a location downstream of the intersection such that the second purge air portion entrains solvent within the dosing chamber;

wherein the sprayer body comprises:

a support housing; and a fluid cartridge mounted to the support housing;

wherein the intersection is formed within the support housing and the mix chamber is at least partially disposed within a cavity formed in the fluid cartridge;

wherein the first passage includes a first upstream portion extending from the intersection to a first outlet aperture formed in the support housing, and the first passage includes a first downstream portion extending from a first inlet aperture formed in the fluid cartridge to the mix chamber; and wherein the second passage includes a second upstream portion extending from the intersection to a second outlet aperture formed in the support housing, and the second passage includes a second downstream portion extending from a second inlet aperture formed in the fluid cartridge to the mix chamber; and wherein the second upstream portion includes an inlet passage extending from the intersection to the dosing chamber and a downstream passage extending from the dosing chamber to the second outlet aperture.

* * * * *